(12) United States Patent
Kim

(10) Patent No.: US 11,346,338 B2
(45) Date of Patent: May 31, 2022

(54) LINEAR COMPRESSOR

(71) Applicant: LG Electronics Inc., Seoul (KR)

(72) Inventor: Jeongwoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/794,960

(22) Filed: Feb. 19, 2020

(65) Prior Publication Data

US 2020/0263687 A1    Aug. 20, 2020

(30) Foreign Application Priority Data

Feb. 19, 2019    (KR) .................. 10-2019-0019522

(51) Int. Cl.
*F04B 53/14*    (2006.01)
*F04B 39/12*    (2006.01)
(Continued)

(52) U.S. Cl.
CPC .......... *F04B 53/14* (2013.01); *F04B 39/0016* (2013.01); *F04B 39/123* (2013.01);
(Continued)

(58) Field of Classification Search
CPC .............. F04B 39/0005; F04B 39/0016; F04B 39/0292; F04B 53/14; F04B 2201/02; F16J 1/08
See application file for complete search history.

(56) References Cited

U.S. PATENT DOCUMENTS 4,854,835 A * 8/1989 Onishi .................... F04B 53/06
                                                              417/435
6,024,544 A * 2/2000 Kim ...................... F04B 35/045
                                                              137/855
(Continued)

FOREIGN PATENT DOCUMENTS

EP    2220370    3/2017
EP    3346127    7/2018
(Continued)

OTHER PUBLICATIONS

Korean Notice of Allowance in Korean Application No. 10-2019-0019522, dated Jun. 24, 2020, 7 pages (with English translation).
(Continued)

*Primary Examiner* — Kenneth Bomberg
*Assistant Examiner* — Matthew Wiblin
(74) *Attorney, Agent, or Firm* — Fish & Richardson P.C.

(57) ABSTRACT

A linear compressor includes a cylinder, a piston, and a discharge valve, wherein the piston includes a first part extending in the axial direction, a second part having a diameter greater than that of the first part and formed at one end of the first part facing the discharge valve, and a third part having a diameter greater than that of the first part and formed at the other end of the first part. The second part includes a first outer circumferential surface extending backward from a front surface of the piston, and a second outer circumferential surface spaced apart from the first outer circumferential surface in a direction away from the discharge valve, and a distance between the first outer circumferential surface and an inner circumferential surface of the cylinder is less than a distance between the second outer circumferential surface and the inner circumferential surface of the cylinder.

20 Claims, 10 Drawing Sheets

(51) Int. Cl.
*F04B 39/00* (2006.01)
*F16J 1/08* (2006.01)

(52) U.S. Cl.
CPC ............... *F04B 39/126* (2013.01); *F16J 1/08* (2013.01); *F04B 2201/02* (2013.01)

(56) References Cited

U.S. PATENT DOCUMENTS

| | | | |
|---|---|---|---|
| 7,124,678 B2 * | 10/2006 | Lee | F04B 35/045 92/140 |
| 2002/0092418 A1 * | 7/2002 | Hefren | F16J 1/10 92/258 |
| 2007/0157801 A1 * | 7/2007 | Hanes | F04B 39/0005 92/127 |
| 2007/0166176 A1 * | 7/2007 | Kang | F04B 39/126 417/417 |
| 2009/0101003 A1 * | 4/2009 | Kim | F04B 39/02 92/159 |
| 2015/0078925 A1 * | 3/2015 | Choi | F04B 53/008 417/228 |
| 2017/0314542 A1 | 11/2017 | Ha et al. | |
| 2019/0072181 A1 * | 3/2019 | Rabhi | F16K 15/026 |

FOREIGN PATENT DOCUMENTS

| | | |
|---|---|---|
| KR | 19990081548 | 11/1999 |
| KR | 101053306 | 8/2011 |
| KR | 101265133 | 5/2013 |
| KR | 20150031726 | 3/2015 |
| KR | 20150040050 | 4/2015 |
| KR | 1020170075430 | 7/2017 |

OTHER PUBLICATIONS

CN Office Action in Chinese Appln. No. 202010103010.3, dated Aug. 4, 2021, 8 pages (with English translation).
DE Office Action in German Appln. No. 102020202088.4, dated May 26, 2021, 10 pages (with English translation).
Notice of Allowance in Chinese Appln. No. 202010103010.3, dated Feb. 11, 2022, 8 pages (with English translation).

* cited by examiner

LINEAR COMPRESSOR

CROSS-REFERENCE TO RELATED APPLICATIONS

The present application claims priority under 35 U.S.C. 119 and 35 U.S.C. 365 to Korean Patent Application No. 10-2019-0019522 (filed on Feb. 19, 2019), which is hereby incorporated by reference in its entirety.

BACKGROUND

The present disclosure relates to a linear compressor.

In general, a compressor is a mechanical device for increasing pressure by receiving power from a power generator such as an electric motor or a turbine and compressing air, refrigerant or various other working gas, and is widely used in home appliances and the whole industry.

Such a compressor may be classified into a reciprocating compressor, a rotary compressor and a scroll compressor.

In the reciprocating compressor, a compression space for compressing working gas is formed between a piston and a cylinder, and refrigerant introduced into the compression space is compressed while the piston linearly reciprocates in the cylinder.

Recently, among reciprocating compressors, a linear compressor having a simple structure and capable of improving compression efficiency without mechanical loss due to motion conversion by directly connecting a linearly reciprocating piston to a driving motor has been developed.

In the related art, Korean Patent Publication No. 10-2017-0075430 (Jul. 3, 2017) discloses a cylinder assembly and a linear compressor including the same.

The above document discloses a cylinder forming a compression space of refrigerant and a piston reciprocating in the cylinder. Specifically, the piston includes a front surface portion forming a front end of the piston and having a suction valve provided thereon, a piston body extending backward from the front surface portion, and a piston flange extending from a rear end of the piston body in a radial direction.

The piston may linearly reciprocate in the cylinder. At this time, oil for reducing friction between the piston and the cylinder is provided between an outer circumferential surface of the piston and an inner circumferential surface of the cylinder. In particular, since a sawtooth-shaped uneven portion may be formed in the outer circumferential surface of the piston and oil is concentrated (compressed) in the uneven portion to increase pressure, floating force of the piston in the cylinder may be increased.

However, the linear compressor disclosed in the above document has the following problems.

First, in the conventional linear compressor, as the piston moves relative to the cylinder, oil leaked through a clearance between the piston and the cylinder. As a result, compressor efficiency deteriorated according to leakage loss.

Second, in order to reduce leakage loss, the clearance between the piston and the cylinder may be reduced. However, in this case, since friction between the piston and the cylinder increases, compression efficiency may deteriorate by friction loss.

SUMMARY

An object of the present disclosure devised to solve the problem lies in a linear compressor capable of maintaining a uniform clearance when a piston reciprocates in a cylinder.

Another object of the present disclosure is to provide a linear compressor capable of preventing bearing refrigerant from leaking through a clearance, by keeping a clearance between a piston and a cylinder small.

Another object of the present disclosure is to provide a linear compressor capable of minimizing refrigerant leakage and reducing friction loss between a piston and a cylinder, by reducing a clearance between the piston and the cylinder.

Another object of the present disclosure is to provide a linear compressor capable of improving floating force of a piston by simple piston machining and thus improving compressor efficiency.

According to the present disclosure, a linear compressor includes a cylinder forming a compression space of refrigerant, and a piston reciprocating in the cylinder in an axial direction. The piston includes a first part extending in the axial direction, a second part having a diameter greater than that of the first part and formed at one end of the first part facing the discharge valve, and a third part having a diameter greater than that of the first part and formed at the other end of the first part.

In particular, the second part may include a first outer circumferential surface extending backward from a front surface of the piston and a second outer circumferential surface spaced apart from the first outer circumferential surface in a direction away from the discharge valve, and a distance between the first outer circumferential surface and an inner circumferential surface of the cylinder may be less than a distance between the second outer circumferential surface and the inner circumferential surface of the cylinder.

Accordingly, when the piston reciprocates in the cylinder, it is possible to minimize leakage of bearing refrigerant, which flows to the outer circumferential surface of the piston, to the compression space of the cylinder through the front surface of the piston. In addition, it is possible to minimize friction loss between the cylinder and the piston, by keeping the distance between the second outer circumferential surface of the piston and the inner circumferential surface of the cylinder equal or similar to an existing distance.

According to one embodiment, a diameter D1 of the first outer circumferential surface may be greater than a diameter D2 of the second outer circumferential surface, and an axial length L1 of the first outer circumferential surface may be greater than or equal to an axial length L2 of the second outer circumferential surface, thereby reducing the amount of the bearing refrigerant leaked to the compression space along the outer circumferential surface of the piston.

The second part may further include a third outer circumferential surface connecting the first outer circumferential surface with the second outer circumferential surface, and a diameter D3 of the third outer circumferential surface may be less than a diameter D2 of the second outer circumferential surface.

A diameter D4 of a front end of the piston may be less than a diameter D1 of the first outer circumferential surface.

The second part may further include a fourth outer circumferential surface extending from a front surface of the piston to the first outer circumferential surface, and the fourth outer circumferential surface may be inclined such that a cross-section area thereof increases backward from the front surface of the piston.

The second part may further include a fifth outer circumferential surface extending from the first outer circumferential surface to the third outer circumferential surface, and the fifth outer circumferential surface may be inclined such that a cross-section area thereof decreases backward from the first outer circumferential surface.

The second part may further include a sixth outer circumferential surface extending from the third outer circumferential surface to the second outer circumferential surface, and the sixth outer circumferential surface may be inclined such that a cross-section area thereof increases backward from the third outer circumferential surface.

The first part may further include a connector forming an outer circumferential surface of the piston and connecting the second part with the third part. At this time, a diameter D5 of the connector may be less than the diameter D3 of the third outer circumferential surface.

The second part may further include a seventh outer circumferential surface extending from the second outer circumferential surface to the connector, and the seventh outer circumferential surface may be inclined such that a cross-section area thereof decreases backward from the second outer circumferential surface.

The third part may include a bearing outer circumferential surface extending backward from the connector, and a diameter D6 of the bearing outer circumferential surface may be greater than a diameter D5 of the connector. The diameter D6 of the bearing outer circumferential surface may be less than or equal to the diameter D2 of the second outer circumferential surface.

A bearing inflow passage, through which some of the refrigerant discharged from the compression space is introduced from an outside to an inside of the cylinder, may be formed in the cylinder, and the refrigerant introduced through the bearing inflow passage may flow along an outer circumferential surface of the piston.

At this time, the piston may linearly reciprocally advance to a top dead center P1 and retreats to a bottom dead center P2, and, when the piston moves to the bottom dead center P2, a portion of the first outer circumferential surface may overlap the bearing inflow passage in a radial direction.

The piston may include a piston body formed in a cylindrical shape and a piston flange extending from the piston body outward in a radial direction, and the first outer circumferential surface and the second outer circumferential surface may be formed in the piston body.

The piston body may be inclined such that a cross-section area thereof decreases from a front surface to a rear surface thereof, and a diameter of a front end of the piston body may be greater than a diameter of a rear end of the piston body.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
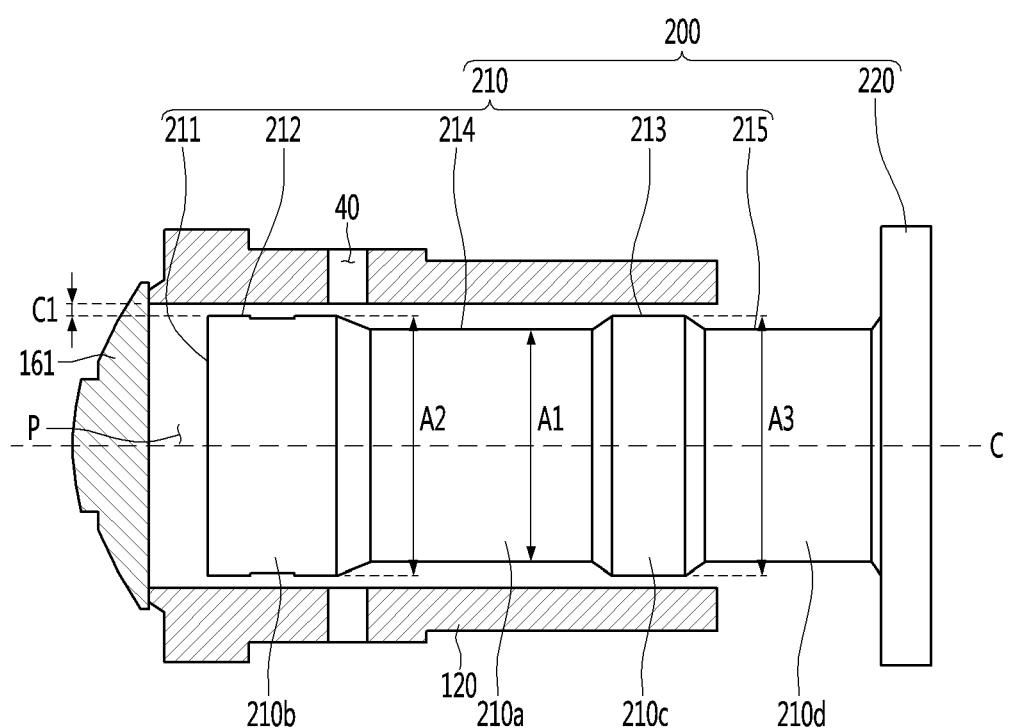
FIG. 1 is a view showing the structure of a piston and a cylinder according to a first embodiment of the present disclosure.
Figure 2:
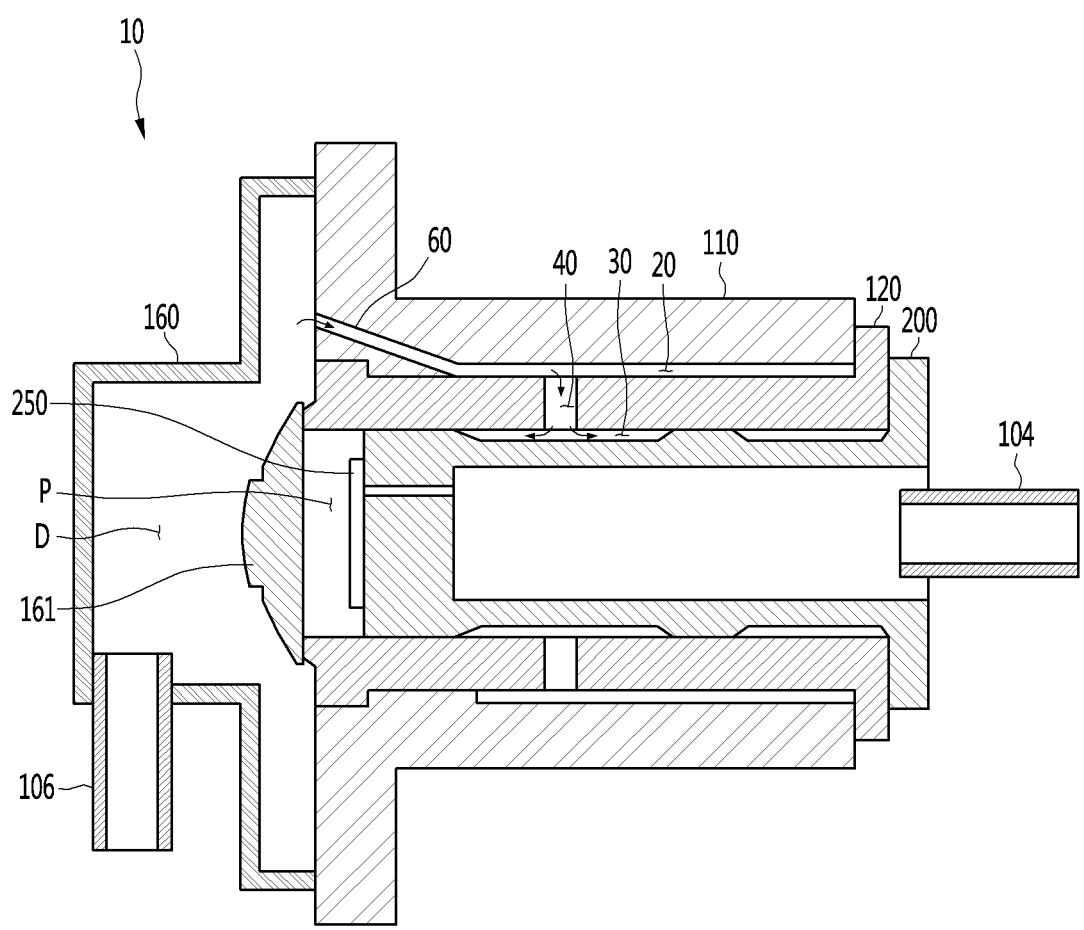
FIG. 2 is a view schematically showing the configuration of a linear compressor according to a first embodiment of the present disclosure.

FIG. 1 is a view showing the structure of a piston and a cylinder according to a first embodiment of the present disclosure, and FIG. 2 is a view schematically showing the configuration of a linear compressor according to a first embodiment of the present disclosure.

Referring to FIGS. 1 and 2, the linear compressor 10 according to the present embodiment includes a piston 200, a cylinder 120 and a frame 110.

The piston 200 is understood as a reciprocating component. The piston 200 corresponds to a component which linearly reciprocates in one direction and compresses refrigerant.

At this time, one direction is defined as an "axial direction". The axial direction C corresponds to a horizontal direction of FIG. 1. In the axial direction, a direction in which the piston 200 moves toward a discharge valve 61 is a "front side" and an opposite direction thereof is a "rear side". That is, in FIG. 1, in the horizontal direction, a left direction may be understood as an "axial-direction front side" and a right direction may be understood as an "axial-direction rear side".

In addition, a direction perpendicular to the axial direction is defined as a "radial direction". In FIG. 1, a vertical direction may be understood as one of radial directions. Among the radial directions, a direction in which the piston 200 moves toward the cylinder 120 is defined as a "radial-direction outer side" and an opposite direction thereof is defined as a "radial-direction inner side".

The piston 200 includes a piston body 210 and a piston flange 220 extending from a rear end of the piston body 210 in the radial direction.

The piston body 210 may linearly reciprocate inside the cylinder 120, and the piston flange 220 may reciprocate outside the cylinder 120.

Specifically, the piston body 210 has a substantially cylindrical shape and is formed in a shape extending in the axial direction. The piston body 210 may have an outer diameter less than an inner diameter of the cylinder 120. Therefore, when the piston body 210 is inserted into the cylinder 120, a clearance 70 may be formed between the outer circumferential surface of the piston body 210 and the inner circumferential surface of the cylinder 120.

The piston body 210 includes a first part 210a extending in the axial direction, a second part 210b formed on one end of the first part 210a, and a third part 210c formed on the other end of the first part 210b.

Here, the second part 210b may be referred to as a "first bearing" or a "front bearing", and the third part 210c may be referred to as a "second bearing" or a "rear bearing".

The first part 210a has a predetermined diameter A1 and extends in the axial direction. In addition, the second part 210b has a diameter A2 greater than the diameter A1 of the first part 210a, and is formed on one end of the first part 210a facing the discharge valve 161. In addition, the third part 210c has a diameter A3 greater than the diameter A1 of the first part 210a and is formed on the other end of the first part 210a.

In addition, the piston body 210 may further include a fourth part 210d formed on an end of the third part 210c. The fourth part 210d may have the same diameter as the diameter A1 of the first part 210a.

At this time, the first part 210a, the second part 210b, the third part 210c and the fourth part 210d may be integrally formed. In addition, the first part 210a and/or the fourth part 210d may be formed in the piston body 210 through grooving.

In another aspect, the piston body 210 includes a front surface portion 211 forming the front end of the piston body 210. The front surface portion 211 may be provided with a suction valve 250. The front surface portion 211 may be disposed to face the discharge valve 161.

In addition, the piston body 210 further includes a side surface portion forming the outer circumferential surface or the circumferential surface of the piston body 210. The side surface portion includes a first bearing 212 and a second bearing 213.

Specifically, the first bearing 212 forms a part of the outer circumferential surface of the piston body 210. The first bearing 212 may be located at the front side of the piston body 210. That is, the first bearing 212 means a portion extending backward from the front surface portion 211 of the piston body 210.

The second bearing 213 forms a portion of the outer circumferential surface of the piston body 210. The second bearing 213 may be located at the rear side of the piston body 210. The second bearing 213 may be located at a point spaced apart a predetermined distance backward from the first bearing 212. That is, the second bearing 213 may be formed between the first bearing 212 and the piston flange 220.

The diameter of the first bearing 212 may be equal to that of the second bearing 213.

Here, since the first bearing 212 is located at the front side of the piston body 210 and thus is referred to as a "front bearing", and the second bearing 213 is located at the rear side of the piston body 210 and thus is referred to as a "rear bearing".

In addition, the side surface portion further includes a first connector 214 for connecting the first bearing 212 with the second bearing 213.

The first connector 214 forms a portion of the outer circumferential surface of the piston body 210, and may be understood as a portion for connecting the first bearing 212 with the second bearing 213.

At this time, the first connector 214 is formed to be recessed inward from the outer circumferential surface of the piston body 210 in the radial direction. That is, the diameter of the first connector 214 may be less than that of the first bearing 212 or the second bearing 213.

In addition, the side surface portion further includes a second connector 215 for connecting the second bearing 213 with the piston flange 220.

The second connector 215 forms a portion of the outer circumferential surface of the piston body 210, and may be understood as a portion for connecting the second bearing 213 with the piston flange 220.

At this time, the second connector 215 is formed to be recessed inward from the outer circumferential surface of the piston body 210 in the radial direction. That is, the diameter of the second connector 215 may be less than that of the first bearing 212 or the second bearing 213.

The diameter of the second connector 215 may be equal to that of the first connector 214. Here, the first connector 214 and the second connector 215 may be collectively referred to as a "connector".

In summary, from the front end or the front surface portion 211 of the piston body 210, the first bearing 212, the first connector 214, the second bearing 213 and the second connector 215 are sequentially connected to form the outer circumferential surface or the side surface of the piston body 210.

The cylinder 120 is formed in a cylindrical shape such that the piston 200 is accommodated therein. The cylinder 120 is disposed at the radial-direction outer side of the piston 200 to surround the outer circumferential surface of the piston 200.

In addition, the cylinder 120 forms a compression space P in which refrigerant is compressed by the piston 200. The compression space P is formed in a space formed at the axial-direction front side of the piston 200 and the inside of the cylinder 120. In addition, the piston 200 may be moved to the axial-direction front side to compress the refrigerant accommodated in the compression space P.

The compression space P may be defined as a space formed between a suction valve 250 and a discharge valve 161. At this time, the suction valve 250 and the discharge valve 161 are understood as components for adjusting flow of the refrigerant.

Meanwhile, the first bearing 212 of the piston 200 faces the discharge valve 161, and is located at a portion closest to the compression space P. That is, since the first bearing 212 is formed in front of the piston 200, the clearance C1 between the first bearing 212 and the cylinder 120 may be understood as an important factor for determining compressor efficiency.

The frame 110 is configured such that the cylinder 120 is accommodated therein. The frame 110 is disposed at the radial-direction outer side of the cylinder 120 to surround the outer circumferential surface of the cylinder 120.

In addition, the linear compressor 10 further includes a suction pipe 104 and a discharge pipe 106. The suction pipe 104 may be understood as a refrigerant pipe, through which refrigerant is introduced into the linear compressor 10, and the discharge pipe 106 may be understood as a refrigerant pipe, through which refrigerant is discharged from the linear compressor 10.

The suction pipe 104 is disposed at the axial-direction rear side of the piston 200 to supply refrigerant to the compression space P. That is, the suction pipe 104 is disposed at the axial-direction rear side of the piston 200 and the compression space P is formed at the axial-direction front side of the piston 200. Accordingly, a direction in which refrigerant flows may be understood as an axial-direction front side. When the piston 200 moves forward, the refrigerant accommodated in the compression space P may be compressed.

In addition, the suction pipe 104 may extend in the reciprocating direction of the piston 200. That is, the suction pipe 104 is provided at the axial-direction rear side of the piston 200 in the axial direction. Therefore, the refrigerant flowing through the suction pipe 104 may flow into the compression space P with minimized flow loss, thereby being compressed.

In addition, the linear compressor 10 is provided with a discharge space D in which refrigerant discharged from the compression space P flows. The discharge space D is formed at the axial-direction front side of the cylinder 120 and the frame 110.

In addition, the linear compressor 10 includes a discharge cover 160 forming the discharge space D. The discharge cover 160 may be coupled to the front side of the frame 110 to form the discharge space D. The discharge pipe 106 may be disposed at one side of the discharge cover 160 such that the refrigerant accommodated in the discharge space D flows.

Meanwhile, a predetermined gap is present between the piston 200, the cylinder 120 and the frame 110. The gap means a small gap for allowing predetermined fluid to flow.

Specifically, the linear compressor 10 includes a first bearing gap 20 formed between the inner circumferential surface of the frame 110 and the outer circumferential surface of the cylinder 120 and a second bearing gap 30 formed between the inner circumferential surface of the cylinder 120 and the outer circumferential surface of the piston 200.

In FIGS. 1 and 2, for convenience of description, the first bearing gap 20 and the second bearing gap 30 are shown relatively broadly. The frame 110, the cylinder 120 and the piston 200 may be in contact with each other.

The linear compressor 10 further includes a bearing inflow passage 40, through which fluid flows from the first bearing gap 20 to the second bearing gap 30. In other words, the bearing inflow passage 40 may be understood as a passage extending from the outer circumferential surface to the inner circumferential surface of the cylinder 120.

In addition, the linear compressor 10 further includes a bearing supply passage 60, through which fluid flows to the first bearing gap 20. The bearing supply passage 60 penetrates through the frame 110. At this time, the bearing supply passage 60 is formed such that at least a portion of the refrigerant discharged to the discharge space D flows into the first bearing gap 20.

Accordingly, the refrigerant flowing into the first bearing gap 20 corresponds to some of the refrigerant flowing into the discharge space D. In addition, the refrigerant flowing into the first bearing gap 20 flows into the second bearing gap 30 through the bearing inflow passage 40.

That is, some of the refrigerant compressed by the piston 200 is supplied to the outer circumferential surface of the piston 200. Such refrigerant may perform the function of the bearing supporting the piston 200. The refrigerant supplied to the outer circumferential surface of the piston 200 may provide flowing force such that the outer circumferential surface of the piston 200 is not directly brought into contact with the inner circumferential surface of the cylinder 120.

As described above, a predetermined clearance C1 is formed between the outer circumferential surface of the piston body 210 and the inner circumferential surface of the cylinder 120. In addition, leakage of the bearing refrigerant may occur by such a clearance C1. The bearing refrigerant is compressed by the piston 200 and corresponds to refrigerant gas having high pressure.

In particular, in a process of driving the linear compressor 10, high-temperature high-pressure refrigerant flows along the outer circumferential surface of the piston body 210, and leak into the compression space P having a relatively low temperature and low pressure through the clearance C1. When refrigerant leakage occurs, the floating force of the piston 200 may be reduced, thereby lowering compressor efficiency.

In order to solve such problems, the clearance C1 between the outer circumferential surface of the piston body 210 and the inner circumferential surface of the cylinder 120 may be designed to be very small. In this case, friction loss between the piston 200 and the cylinder 120 may increase.

Accordingly, the present disclosure proposes a piston structure capable of reducing leakage loss of the bearing refrigerant and minimizing friction loss between the piston and the cylinder.

Hereinafter, the piston structure according to the embodiment of the present disclosure will be described in detail with reference to the drawings.

Figure 3:
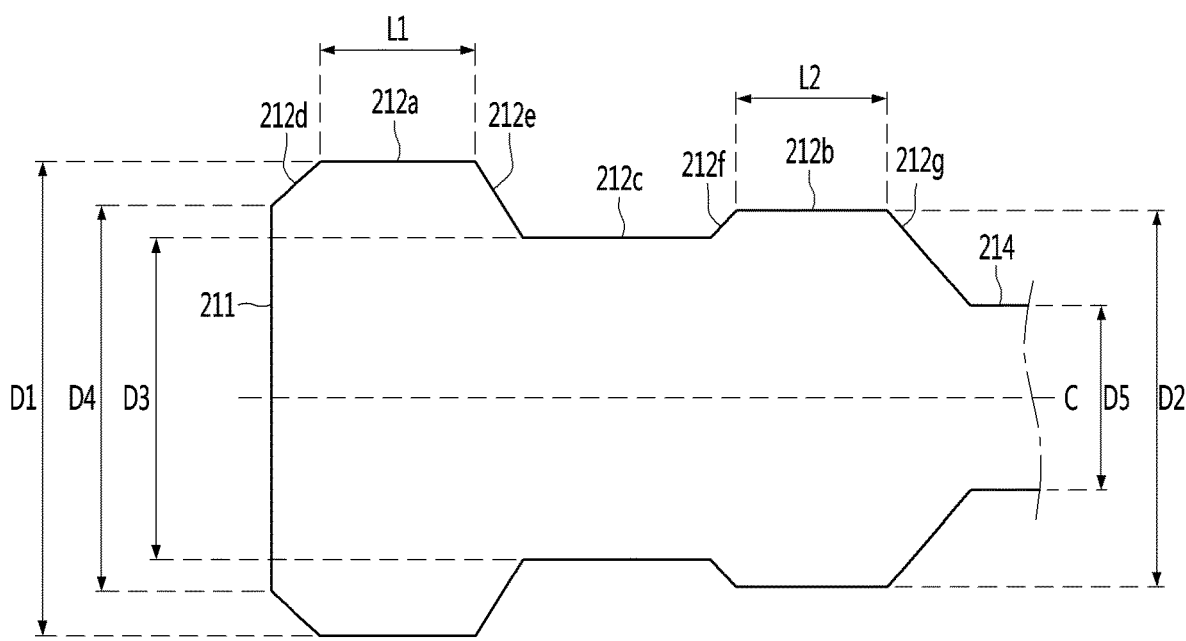
FIG. 3 is a view showing a first bearing structure of a piston according to a first embodiment of the present disclosure.
Figure 4:
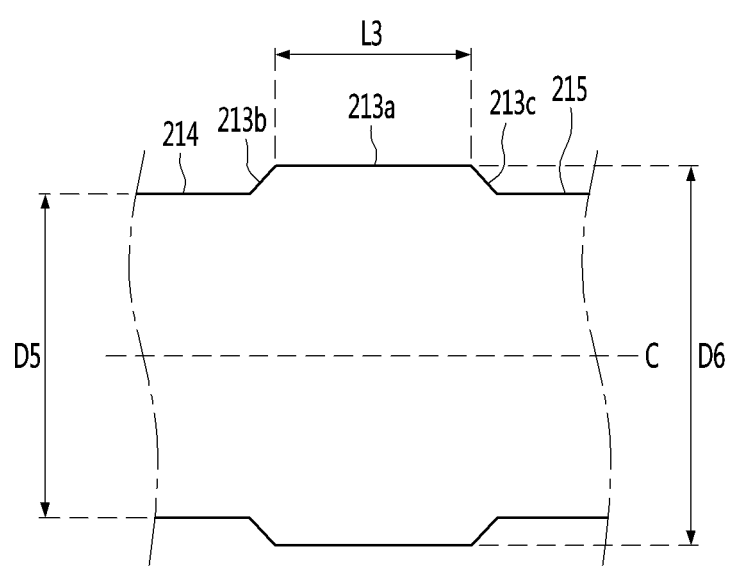
FIG. 4 is a view showing a second bearing structure of a piston according to a first embodiment of the present disclosure.

FIG. 3 is a view showing a first bearing structure of a piston according to a first embodiment of the present disclosure. and FIG. 4 is a view showing a second bearing structure of a piston according to a first embodiment of the present disclosure.

In FIG. 3, for convenience of description, a difference in diameter between the portions forming the first bearing 212 is relatively large. However, the difference in diameter between the parts forming the first bearing 212 is substantially several μm.

First, referring to FIG. 3, the first bearing 212 or the second part 210b includes a first outer circumferential surface 212a and a second outer circumferential surface 212b.

Specifically, the first outer circumferential surface 212a forms a portion of the outer circumferential surface of the first bearing 212. The first outer circumferential surface 212a may be located at the front side of the first bearing 212. That is, the first outer circumferential surface 212a may be formed to extend backward from the front surface portion 211 of the piston body 210.

At this time, the first outer circumferential surface 212a is formed to have a first diameter D1 and have a first length L1 in the axial direction. That is, the first outer circumferential surface 212a may be formed in a cylindrical shape having a first diameter D1 and may extend by a first length L1.

The first outer circumferential surface 212a may be disposed to face the discharge valve 161 and may be disposed adjacent to the compression space P.

In addition, the second outer circumferential surface 212b forms a portion of the outer circumferential surface of the first bearing 212. The second outer circumferential surface 212b may be located at the rear side of the first bearing 212. At this time, the second outer circumferential surface 212b may be located at a point spaced apart a predetermined distance backward from the first outer circumferential surface 212a.

The second outer circumferential surface 212b is formed to have a second diameter D2 and have a second length L2 in the axial direction. That is, the second outer circumferential surface 212b may be formed in a cylindrical shape having a second diameter D2 and may extend by a second length L2.

In particular, in the present disclosure, the diameter of the first outer circumferential surface 212a is greater than that of the second outer circumferential surface 212b. That is, the first diameter D1 is greater than the second diameter D2 by several μm.

By such a configuration, the clearance between the first outer circumferential surface 212a and the cylinder 120 may be less than the clearance between the second outer circumferential surface 212b and the cylinder 120. That is, the clearance between the first outer circumferential surface 212a and the cylinder 120 may be relatively small and the clearance between the second outer circumferential surface 212b and the cylinder 120 may be relatively large.

In this case, bearing refrigerant flowing to the first bearing 212 may flow along the first outer circumferential surface 212a, thereby minimizing leakage into the compression space P. In addition, bearing refrigerant flowing to the first bearing 212 may flow along the second outer circumferential surface 212b, thereby reducing friction loss between the piston 200 and the cylinder 120.

In addition, the axial length of the first outer circumferential surface 212a may be greater than that of the second outer circumferential surface 212b. That is, the first length L1 may be greater than the second length L2 by a predetermined length.

When the axial length L1 of the first outer circumferential surface 212a is greater than the axial length L2 of the second outer circumferential surface 212b, the length of the passage or the length of the clearance between the first outer circumferential surface 212a and the cylinder 120 may increase.

Then, bearing refrigerant flowing to the first bearing 212 is subjected to flow resistance while passing through the first outer circumferential surface 212a, thereby significantly reducing the amount of refrigerant leaking toward the compression space P. That is, flow resistance may be generated, by increasing the axial length of the passage, through which the bearing refrigerant flows.

In addition, the first bearing 212 may further include a third outer circumferential surface 212c.

The third outer circumferential surface 212c forms a portion of the outer circumferential surface of the first bearing 212. The third outer circumferential surface 212c is understood as a portion for connecting the first outer circumferential surface 212a with the second outer circumferential surface 212b. That is, the third outer circumferential surface 212c is located between the first outer circumferential surface 212a and the second outer circumferential surface 212b.

The third outer circumferential surface 212c has a third diameter D3 and is formed to extend in the axial direction. That is, the third outer circumferential surface 212c may be formed in a cylindrical shape having a third diameter D3.

At this time, the diameter of the third outer circumferential surface 212c is less than that of the second outer circumferential surface 212b. That is, the third diameter D3 is less than the second diameter D2. The diameter of the third outer circumferential surface 212c may have the smallest diameter among all the outer circumferential surfaces of the first bearing 212.

By such a configuration, the clearance between the third outer circumferential surface 212c and the cylinder 120 may be greater than the clearance between the first outer circumferential surface 212a or the second outer circumferential surface 212b and the cylinder. In other words, the distance between the third outer circumferential surface 212c of the first bearing and the cylinder 120 may be largest.

In addition, the third outer circumferential surface 212c may be recessed inward from the outer circumferential surface of the first bearing 212 in the radial direction. That is, the third outer circumferential surface 212c may be formed in the outer circumferential surface of the piston body 210 through grooving. In addition, bearing refrigerant flowing to the first bearing 212 may flow along the second outer circumferential surface 212b, flow to the third outer circumferential surface 212c, and then flow to the first outer circumferential surface 212a.

In addition, the first bearing 212 further includes a fourth outer circumferential surface 212d.

The fourth outer circumferential surface 212d forms a portion of the outer circumferential surface of the first bearing 212. The fourth outer circumferential surface 212d may be formed on the front end of the first bearing 212.

That is, the fourth outer circumferential surface 212d may mean a portion extending backward from the front surface portion 211. The fourth outer circumferential surface 212d is formed to extend from the front surface portion 211 to a first extension 212a. At this time, the fourth outer circumferential surface 212d may be inclined such that the diameter thereof increases backward from the front surface portion 211.

In addition, the first bearing 212 further includes a fifth outer circumferential surface 212e.

The fifth outer circumferential surface 212e forms a portion of the outer circumferential surface of the first bearing 212. The fifth outer circumferential surface 212e may be understood as a portion for connecting the first outer circumferential surface 212a with the third outer circumferential surface 212c. That is, the fifth outer circumferential surface 212e is located between the first outer circumferential surface 212a and the third outer circumferential surface 212c.

The fifth outer circumferential surface 212e is formed to extend from the first outer circumferential surface 212a to a third extension 212c. At this time, the fifth outer circumferential surface 212e may be inclined such that the diameter thereof decreases backward from the rear side of the first outer circumferential surface 212a.

In addition, the first bearing 212 further includes a sixth outer circumferential surface 212f.

The sixth outer circumferential surface 212f forms a portion of the outer circumferential surface of the first bearing 212. The sixth outer circumferential surface 212f is understood as a portion for connecting the third outer circumferential surface 212c with the second outer circumferential surface 212b. That is, the sixth outer circumferential surface 212f is located between the third outer circumferential surface 212c and the second outer circumferential surface 212b.

The sixth outer circumferential surface 212f is formed to extend from the third outer circumferential surface 212c to the second extension 212b. At this time, the sixth outer circumferential surface 212f may be inclined such that the diameter thereof increases backward from the rear end of the third outer circumferential surface 212c.

In addition, the first bearing 212 further includes a seventh outer circumferential surface 212g.

The seventh outer circumferential surface 212g forms a portion of the outer circumferential surface of the first bearing 212. The seventh outer circumferential surface 212g may be formed on the rear end of the first bearing 212.

The seventh outer circumferential surface 212g may be understood as a portion for connecting the second outer circumferential surface 212b with the first connector 214. That is, the seventh outer circumferential surface 212g is located between the second outer circumferential surface 212b and the first connector 214.

The seventh outer circumferential surface 212g is formed to extend from the second outer circumferential surface 212b to the first connector 214. At this time, the seventh outer circumferential surface 212g may be inclined such that the diameter decreases backward from the rear end of the second outer circumferential surface 212b.

Here, the diameter D4 of the front end of the first bearing 212 may be greater than the diameter D3 of the third outer circumferential surface 212c and may be less than the diameter D1 of the first outer circumferential surface 212a. In addition, the diameter D5 of the first connector 214 may be less than the diameter D3 of the third outer circumferential surface 212c.

In summary, from the front surface portion 211 of the first bearing 212, the fourth outer circumferential surface 212d, the first outer circumferential surface 212a, the fifth outer circumferential surface 212e, the third outer circumferential surface 212c, the sixth outer circumferential surface 212f, the second outer circumferential surface 212b and the seventh outer circumferential surface 212g may be sequentially connected to form the side surface or the outer circumferential surface of the first bearing 212.

Meanwhile, referring to FIG. 4, the second bearing 213 or the third part 210c includes a bearing outer circumferential surface 213a.

Specifically, the bearing outer circumferential surface 213a forms at least a portion of the outer circumferential surface of the second bearing 213. The bearing outer circumferential surface 213a is formed to have a sixth diameter D6 and have a third length L3 in the axial direction. That is, the bearing outer circumferential surface 213a may be formed in a cylindrical shape having a third diameter D3 and may extend by a third length L3.

Here, the diameter of the bearing outer circumferential surface 213a of the second bearing 213 may be greater than the diameter of the first connector 214 or the second connector 215. That is, the sixth diameter D6 may be greater than the fifth diameter D5.

In addition, the diameter of the bearing outer circumferential surface 213a of the second bearing 213 may be less than that of the first outer circumferential surface 212a of the first bearing 212. That is, the sixth diameter D6 may be less than the first diameter D1.

In addition, the diameter of the bearing outer circumferential surface 213a of the second bearing 213 may be equal to that of the second outer circumferential surface of the first bearing 212. That is, the sixth diameter D6 may be equal to the second diameter D2.

In addition, the axial length of the first outer circumferential surface 212a of the second bearing 213 may be greater than the axial length of the first outer circumferential surface 212a or the second outer circumferential surface 212b of the first bearing 212. That is, the sixth length L6 may be greater than the first length L1 or the second length L2.

That is, the axial length of the bearing outer circumferential surface 213a of the second bearing 213 may be greater than that of the first outer circumferential surface 212a or the second outer circumferential surface 212b of the first bearing 212, thereby minimizing leakage of bearing refrigerant to the outside of the cylinder 120 through the second bearing 213.

In addition, the second bearing 213 further includes a first extension surface 213b.

The first extension surface 213b forms a portion of the outer circumferential surface of the second bearing 213. The first extension surface 213b may be formed on the front end of the second bearing 213.

That is, the first extension surface 213b may mean a portion extending backward from the first connector 214. The first extension surface 213b is formed to extend from the first connector 214 to the bearing outer circumferential surface 213a. At this time, the first extension surface 213b may be inclined such that the diameter thereof increases backward from the first connector 214.

In addition, the second bearing 213 further includes a second extension surface 213c.

The second extension surface 213c forms a portion of the outer circumferential surface of the second bearing 213. The second extension surface 213c may be formed on the rear end of the second bearing 213.

That is, the second extension surface 213c may mean a portion extending backward from the bearing outer circumferential surface 213a. The second extension surface 213c is formed to extend from the bearing outer circumferential surface 213a to the second connector 215. At this time, the second extension surface 213c may be inclined such that the diameter thereof decreases backward from the bearing outer circumferential surface 213a.

Figure 5:
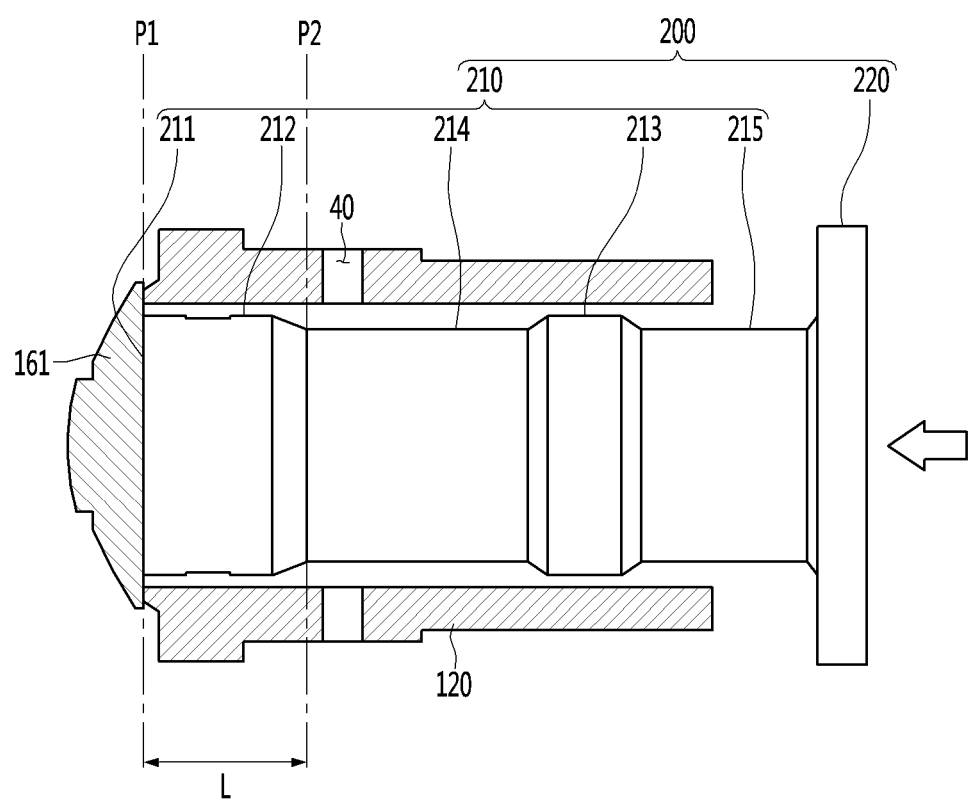
FIG. 5 is a view showing a state in which a piston according to a first embodiment of the present disclosure advances to a top dead center.
Figure 6:
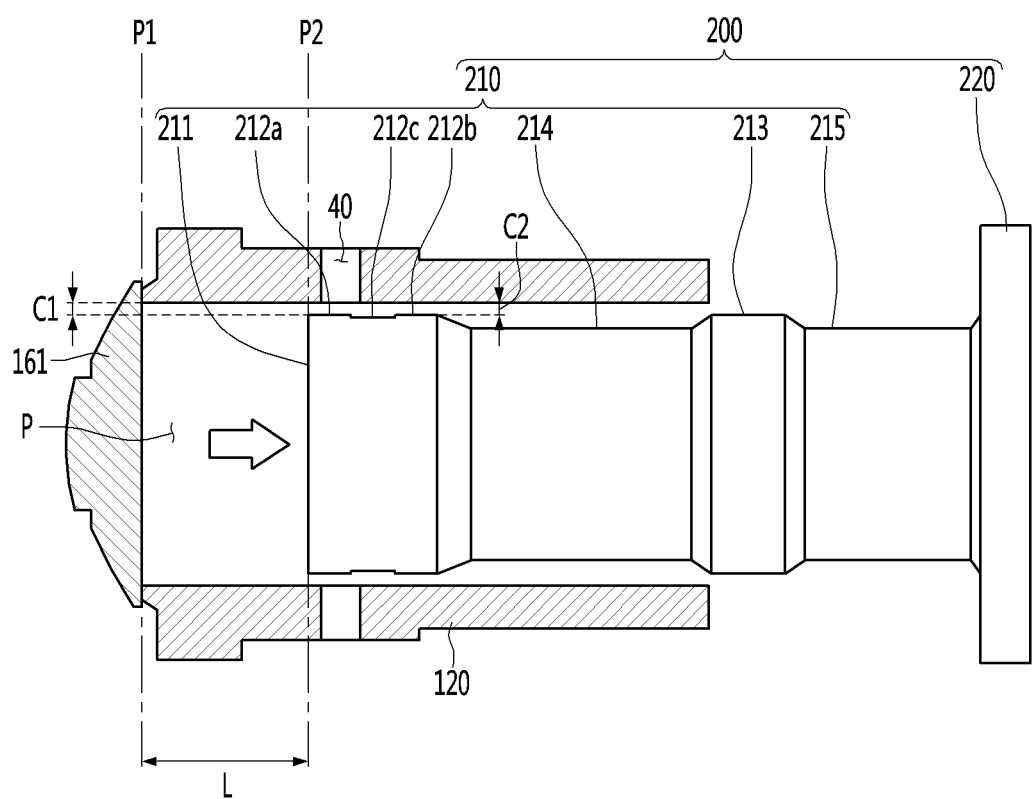
FIG. 6 is a view showing a state in which a piston according to a first embodiment of the present disclosure retreats to a bottom dead center.

FIG. 5 is a view showing a state in which a piston according to a first embodiment of the present disclosure advances to a top dead center, and FIG. 6 is a view showing a state in which a piston according to a first embodiment of the present disclosure retreats to a bottom dead center.

Referring to FIGS. 5 and 6, the piston 200 may linearly reciprocate forward and backward in the cylinder 120. In the present embodiment, the top dead center P1 may be understood as a point corresponding to the front surface portion or the front end of the cylinder in the axial direction, and the bottom dead center P2 may be understood as a point spaced apart a predetermined distance backward from the top dead center P1. That is, the piston 200 may have a stroke distance L from the top dead center P1 to the bottom dead center P2.

At this time, the bottom dead center P2 may be located at a point spaced apart at a predetermined distance forward from the bearing inflow passage 40. That is, the bottom dead center P2 may be located between the front surface portion of the cylinder 120 and the bearing inflow passage 40.

As shown in FIG. 5, the piston 200 advances to the top dead center P1 to compress and discharge refrigerant. In addition, when the front surface portion 211 of the piston 200 is located at the top dead center P1, the bearing inflow passage 40 of the cylinder 120 and the first connector 214 of the piston 200 overlap or communicate with each other.

In addition, the bearing refrigerant may be flow to the outer circumferential surface of the piston 200 through the bearing inflow passage 40. In addition, the introduced bearing refrigerant flows along the outer circumferential surface of the piston 200, thereby performing a bearing function.

Meanwhile, as shown in FIG. 6, the piston 200 retreats to the bottom dead center P2 to suck refrigerant. In particular, while the piston 200 retreats, the first bearing 212 of the piston 200 may be exposed to or overlap the bearing inflow passage 40.

Specifically, while the piston 200 retreats, the second outer circumferential surface 212b of the first bearing 212 may be entirely exposed to the bearing inflow passage 40. In other words, while the piston 200 retreats, the second outer circumferential surface 212b of the first bearing 212 may pass through the bearing inflow passage 40. At this time, when the front surface portion 211 of the piston 200 is located at the bottom dead center P2, the second outer circumferential surface 212b of the first bearing 212 may be located at the rear side of the bearing inflow passage 40.

In addition, when the front surface portion of the piston 200 is located at the bottom dead center P2, a portion of the first outer circumferential surface 212a of the first bearing 212 may overlap or be exposed to the bearing inflow passage 40. At this time, the first outer circumferential surface 212a does not completely overlap or may not be completely exposed to the bearing inflow passage 40. That is, the front surface portion 211 of the first outer circumferential surface 212a is located at the front side of the front end of the bearing inflow passage 40 in the axial direction.

By such a configuration, the clearance C1 between the first outer circumferential surface 212a and the inner circumferential surface of the cylinder 120 may be kept relatively small, thereby minimizing leakage of the refrigerant introduced through the bearing inflow passage 40 to the compression space P through the clearance C1.

In contrast, the clearance C2 between the second outer circumferential surface 212b of the first bearing 212 and the inner circumferential surface of the cylinder 120 are relatively greater than the clearance C1 between the first outer circumferential surface 212a and the inner circumferential surface of the cylinder 120, thereby minimizing friction loss between the piston 200 and the cylinder 120.

That is, it is possible to minimize leakage of the refrigerant through the first bearing 212 of the piston 200, while minimizing friction loss between the piston 200 and the cylinder 120. Therefore, it is possible to improve floating force of the piston 200 and improve compression efficiency of the linear compressor 10.

Figure 7:
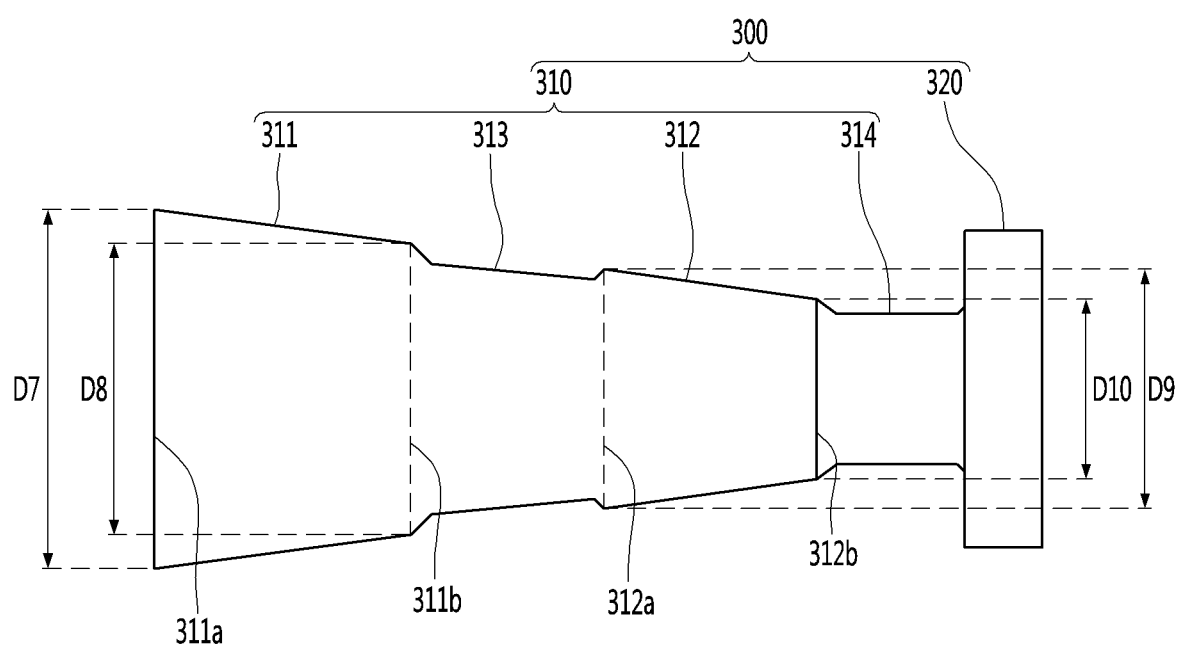
FIG. 7 is a view schematically showing the structure of a piston according to a second embodiment of the present disclosure.

FIG. 7 is a view schematically showing the structure of a piston according to a second embodiment of the present disclosure.

The present embodiment is equal to the first embodiment except for the structure of the piston. Accordingly, hereinafter, only the characteristic portions of the present embodiment will be described. For the same portions as the first embodiment, refer to the description of the first embodiment.

In FIG. 7, for convenience of description, a difference in diameter between the portions forming the piston is relatively large. However, the difference in diameter between the parts forming the piston is substantially several μm.

Referring to FIG. 7, the linear compressor 10 according to the present embodiment includes a piston 300, a cylinder 120 and a frame 110.

Since the cylinder 120 and the frame 110 are the same as the above-described first embodiment, the detailed description of the cylinder 120 and the frame 110 will be omitted.

The piston 300 is understood as a component reciprocating in the cylinder 120. The piston 300 corresponds to a component which linearly reciprocates in the axial direction and compresses refrigerant.

The piston 300 includes a piston body 310 and a piston flange 320 extending from the rear end of the piston body 310 in the radial direction.

The piston body 310 may linearly reciprocate inside the cylinder 120, and the piston flange 320 may reciprocate outside the cylinder 120.

Specifically, the piston body 310 has a substantially cylindrical shape and is formed in a shape extending in the axial direction. The piston body 310 may have an outer diameter less than the inner diameter of the cylinder 120. Therefore, when the piston body 310 is inserted into the cylinder 120, a gap may be formed between the outer circumferential surface of the piston body 310 and the inner circumferential surface of the cylinder 120.

In particular, the piston body 310 has an outer diameter decreasing backward from the front surface. That is, the piston body 310 may be tapered such that the cross-sectional area thereof decreases backward from the front surface. Accordingly, the diameter of the front end of the piston body 310 is greater than that of the rear end thereof.

Specifically, the piston body 310 includes a first bearing 311, a second bearing 312 and a first connector 313. In addition, the piston body 310 may further include a second connector 314.

The first bearing 311 forms a portion of the outer circumferential surface of the piston body 310. The first bearing 311 may be located at the front side of the piston body 310. That is, the first bearing 311 means a portion extending backward from the front end of the piston body 310.

The first bearing 311 is disposed in the cylinder 120 to face the discharge valve 161. In addition, the first bearing 311 may be disposed closest to the compression space P of the cylinder 120.

The first bearing 311 may have a circular cross section. In addition, the first bearing 311 is formed such that the cross-section area thereof decreases backward from the front surface portion 311a. That is, the first bearing 311 may be tapered such that the outer diameter decreases from the front surface portion 311a to the rear surface portion 311b. Therefore, the diameter D7 of the front surface portion 311a of the first bearing 311 is greater than the diameter D8 of the rear surface portion 311b.

In addition, the second bearing 312 forms a portion of the outer circumferential surface of the piston body 310. The second bearing 312 may be located at a point spaced apart backward from the first bearing 311.

The second bearing 312 may have a circular cross section. In addition, the second bearing 312 is formed such that the cross-section area thereof decreases backward from the front surface portion 312a. That is, the second bearing 312 may be tapered such that the outer diameter thereof decreases from the front surface portion 312a to the rear surface portion 312b. Therefore, the diameter D9 of the front surface portion 312a of the second bearing 312 is greater than the diameter D10 of the rear surface portion 312a.

In addition, the first connector 313 forms a portion of the outer circumferential surface of the piston body 310, and may be understood as a portion for connecting the first bearing 311 with the second bearing 312. That is, the first connector 313 is located between the first bearing 311 and the second bearing 312.

The first connector 313 may have a circular cross section. In addition, the first connector 313 is tapered such that the cross-section area thereof decreases backward from the front surface thereof.

The first connector 313 is formed to be recessed inward from the outer circumferential surface of the piston body 300 in the radial direction. That is, the first connector 313 may be formed in the outer circumferential surface of the piston body 310 through grooving.

In addition, the second connector 314 forms a portion of the outer circumferential surface of the piston body 310, and may be understood as a portion for connecting the second bearing 312 with the piston flange 320. That is, the second connector 314 is located between the second bearing 312 and the piston flange 320.

The second connector 314 may have a circular cross section. The second connector 314 is tapered such that the cross-section area thereof decreases backward from the front surface thereof.

The second connector 314 is formed to be recessed inward from the outer circumferential surface of the piston body 300 in the radial direction. That is, the second connector 314 may be formed in the outer circumferential surface of the piston body 310 through grooving.

In summary, from the front surface of the piston body 310, the first bearing 311, the first connector 313, the second bearing 312 and the second connector 314 may be sequentially connected to form the piston body 310 or the outer circumferential surface of the piston body 310.

According to the configuration of the present embodiment, the gap between the outer circumferential surface of the piston body 310 and the inner circumferential surface of the cylinder 120 gradually increases backward from the front surface of the piston body 310. That is, the clearance between the front surface portion 311a of the first bearing 311 and the inner circumferential surface of the cylinder 120 may be largest, and the clearance between the outer circumferential surface of the second connector 314 and the inner circumferential surface of the cylinder 120 may be smallest.

Therefore, the clearance between the first bearing 311 and the inner circumference surface of the cylinder 120 may be kept relatively small, thereby minimizing leakage of the bearing refrigerant, which is introduced through the bearing inflow passage 40, to the compression space P through the first bearing 311.

In contrast, since the clearance between the outer circumferential surface of the second bearing 312 and the inner circumferential surface of the cylinder 120 is greater than the clearance between the outer circumferential surface of the second bearing 312 and the inner circumferential surface of the cylinder 120, thereby minimizing friction loss between the piston 300 and the cylinder 120.

Figure 8:
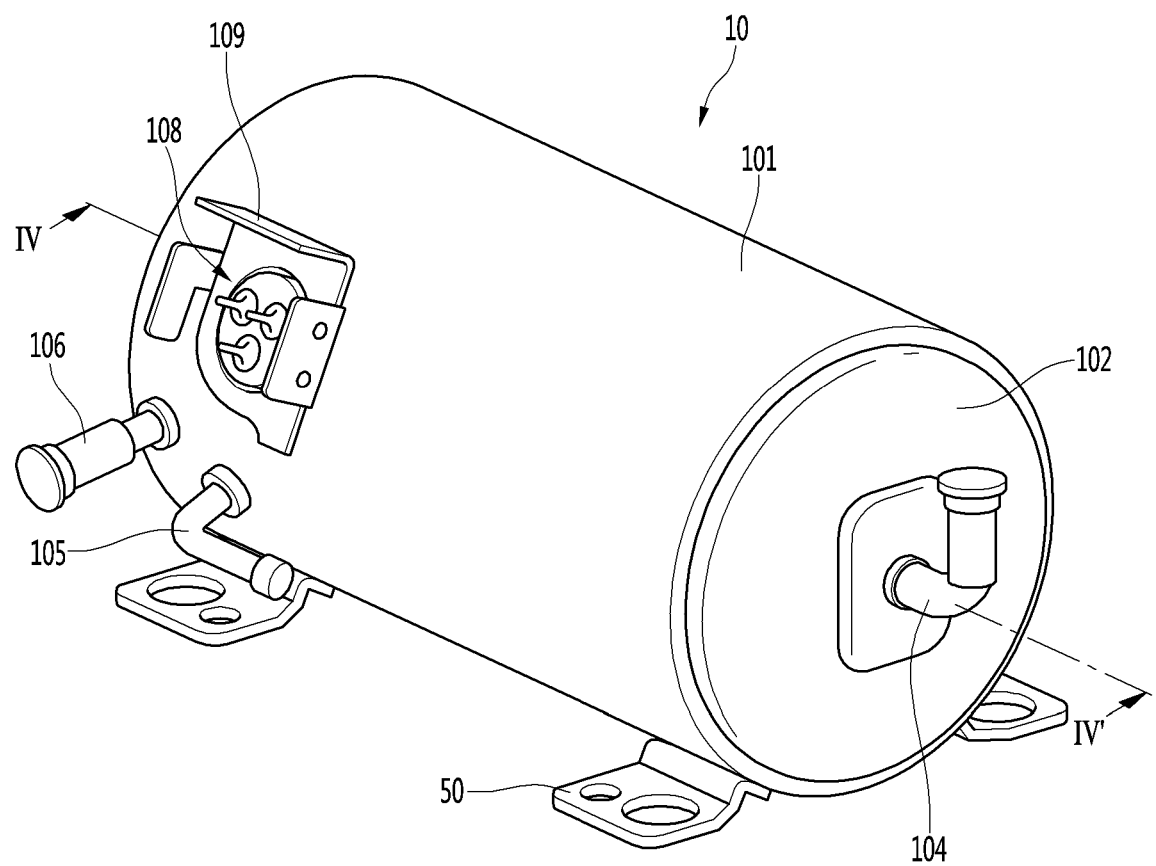
FIG. 8 is a perspective view of a linear compressor according to a first embodiment of the present disclosure.

FIG. 8 is a perspective view of a linear compressor according to a first embodiment of the present disclosure.

Referring to FIG. 8, the linear compressor 10 according to the first embodiment of the present disclosure includes a shell 101 and shell covers 102 and 103 coupled to the shell 101. In a broad sense, the shell covers 102 and 103 may be understood as one component of the shell 101.

Legs 50 are coupled to the lower side of the shell 101. The legs 50 may be coupled to a base of a product in which the linear compressor 10 is installed. For example, the product includes a refrigerator and the base may include a machine room base of the refrigerator. In another example, the product may include an outdoor unit of an air conditioner, and the base may include the base of the outdoor unit.

The shell 101 may have a substantially cylindrical shape and may lie in the horizontal direction or the axial direction. In FIG. 8, the shell 101 may extend in the horizontal direction and have a slightly lower height in the radial direction. That is, since the linear compressor 10 may have a lower height, for example, when the linear compressor 10 is installed in the machine room base of the refrigerator, it is possible to reduce the height of the machine room.

A terminal 108 may be installed on the outer surface of the shell 101. The terminal 108 is understood as a component for transmitting external power to a motor assembly 140 (see FIG. 10) of the linear compressor. In particular, the terminal 108 may be connected to a lead wire of a coil 141c (see FIG. 10).

A bracket 109 is installed outside the terminal 108. The bracket 109 may include a plurality of brackets surrounding the terminal 108. The bracket 109 may perform a function for protecting the terminal 108 from external impact.

The shell 101 is configured such that both sides thereof are open. The open sides of the shell 101 may be coupled with the shell covers 102 and 103. Specifically, the shell covers 102 and 103 include a first shell cover 102 coupled to one open side of the shell 101 and a second shell cover 103 coupled to the other open side of the shell 101. By the shell covers 102 and 103, the internal space of the shell 101 may be sealed.

In FIG. 8, the first shell cover 102 may be located at the right side of the linear compressor 10, and the second shell cover 103 may be at the left side of the linear compressor 10. In other words, the first and second shell covers 102 and 103 may be disposed to face each other.

The linear compressor 10 further includes a plurality of pipes 104, 105 and 106 provided in the shell 101 or the shell covers 102 and 103 to suck, discharge or inject refrigerant.

The plurality of pipes 104, 105 and 106 includes a suction pipe 104 for allowing refrigerant to be sucked into the linear compressor 10, a discharge pipe 105 for allowing compressed refrigerant to be discharged from the linear compressor 10 and a process pipe 106 for injecting refrigerant into the linear compressor 10.

For example, the suction pipe 104 may be coupled to the first shell cover 102. The refrigerant may be sucked into the linear compressor 10 through the suction pipe 104 in the axial direction.

The discharge pipe 105 may be coupled to the outer circumferential surface of the shell 101. The refrigerant sucked through the suction pipe 104 may be compressed while flowing in the axial direction. In addition, the compressed refrigerant may be discharged through the discharge pipe 105. The discharge pipe 105 may be disposed closer to the second shell cover 103 than to the first shell cover 102.

The process pipe 106 may be coupled to the outer circumferential surface of the shell 101. An operator may inject the refrigerant into the linear compressor 10 through the process pipe 106.

The process pipe 106 may be coupled to the shell 101 at a height different from that of the discharge pipe 105, in order to avoid interference with the discharge pipe 105. The height is understood as a distance from the leg 50 in the vertical direction (or the radial direction). The discharge pipe 105 and the process pipe 106 are coupled to the outer circumferential surface of the shell 101 at different heights, thereby achieving working convenience.

At least a portion of the second shell cover 103 may be located adjacent to the inner circumferential surface of the shell 101 corresponding to a point where the process pipe 106 is coupled. In other words, at least a portion of the second shell cover 103 may function as resistance of the refrigerant injected via the process pipe 106.

Accordingly, in view of the passage of the refrigerant, the size of the passage of the refrigerant introduced through the process pipe 106 is formed to be decreased by the second shell cover 103 while the refrigerant is introduced into the internal space of the shell 101 and to be increased again while the refrigerant passes therethrough. In this process, the pressure of the refrigerant may be reduced to vaporize the refrigerant and, in this process, oil included in the refrigerant may be separated. Accordingly, while the refrigerant, from which oil is separated, is introduced into the piston 130 (see FIG. 3), the compression performance of the refrigerant may be improved. The oil may be understood as working oil present in a cooling system.

A cover support portion 102a (see FIG. 10) is provided on the inner side surface of the first shell cover 102. The cover support portion 102a may be coupled with a second support device 185 which will be described below. The cover support portion 102a and the second support device 185 may be understood as a device supporting the body of the linear compressor 10.

Here, the body of the linear compressor 10 means a component provided inside the shell 101 and may include a driving unit reciprocating back and forth and a support unit supporting the driving unit.

The driving unit may include components such as the piston 200, a magnet 146, a supporter 137 and a muffler 150. The support unit may include components such as resonant springs 176a and 176b, a rear cover 170, a stator cover 149, a first support device 165 and a second support device 185.

A stopper 102b (see FIG. 10) may be provided on an inner surface of the first shell cover 102. The stopper 102b is understood as a component for preventing the body of the linear compressor 10 and, more particularly, a motor assembly 140, from being damaged due to collision with the shell 101 by vibration or impact generated during transportation of the linear compressor 10.

The stopper 102b is located adjacent to a rear cover 170 and, when the linear compressor 10 is shaken, the rear cover 170 interferes with the stopper 102b, thereby preventing impact from being transmitted to the motor assembly 140.

A spring fastener 101a (see FIG. 10) may be provided on the inner circumferential surface of the shell 101. For example, the sprint fastener 101a may be disposed at a position adjacent to the second shell cover 103. The spring fastener 101a may be coupled to the first support spring 166 of the first support device 165. The spring fastener 101a and the first support device 165 are coupled, such that the body of the compressor may be stably supported inside the shell 101.

Figure 9:
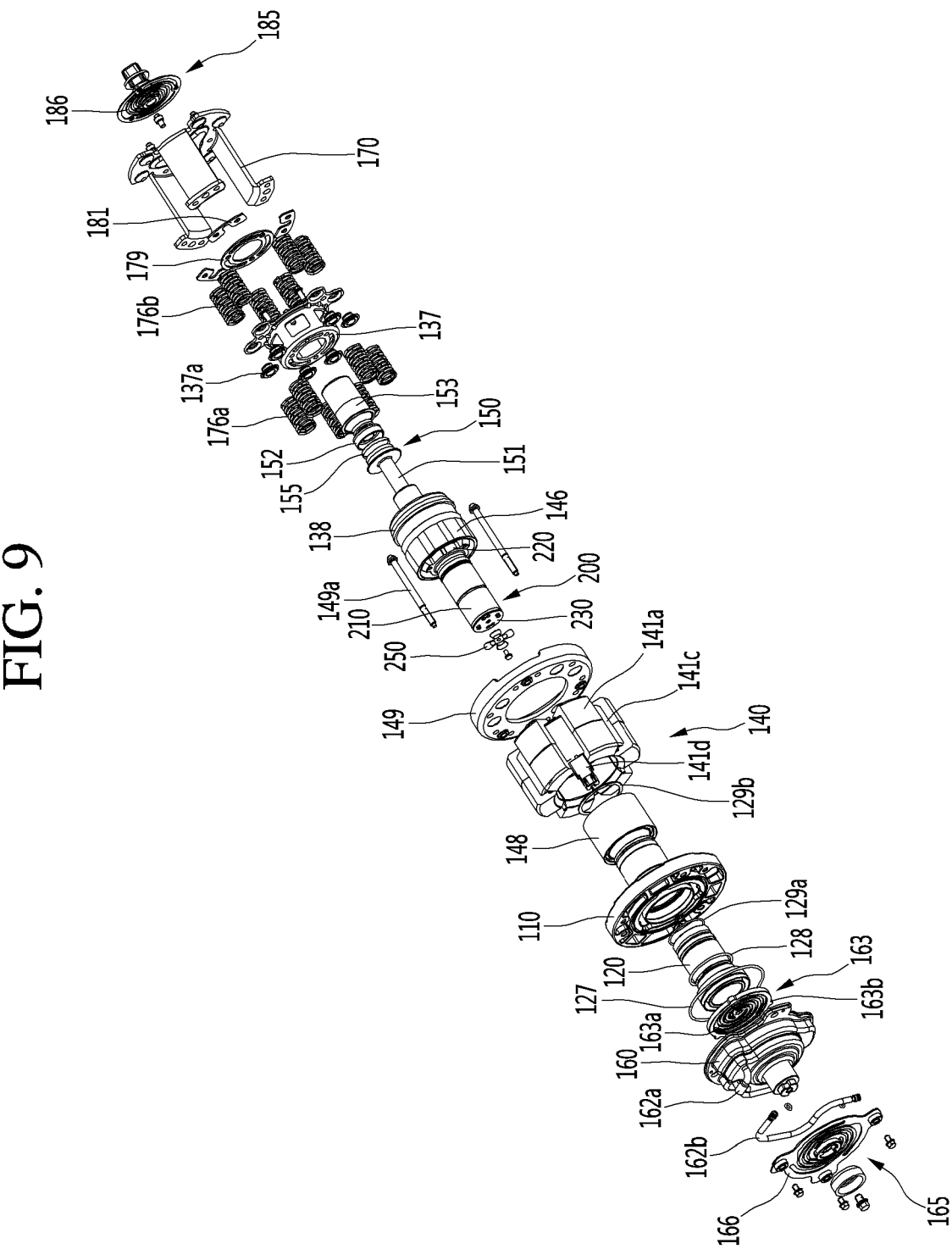
FIG. 9 is an exploded perspective view of a compressor body accommodated in a shell of a linear compressor according to a first embodiment of the present disclosure.
Figure 10:
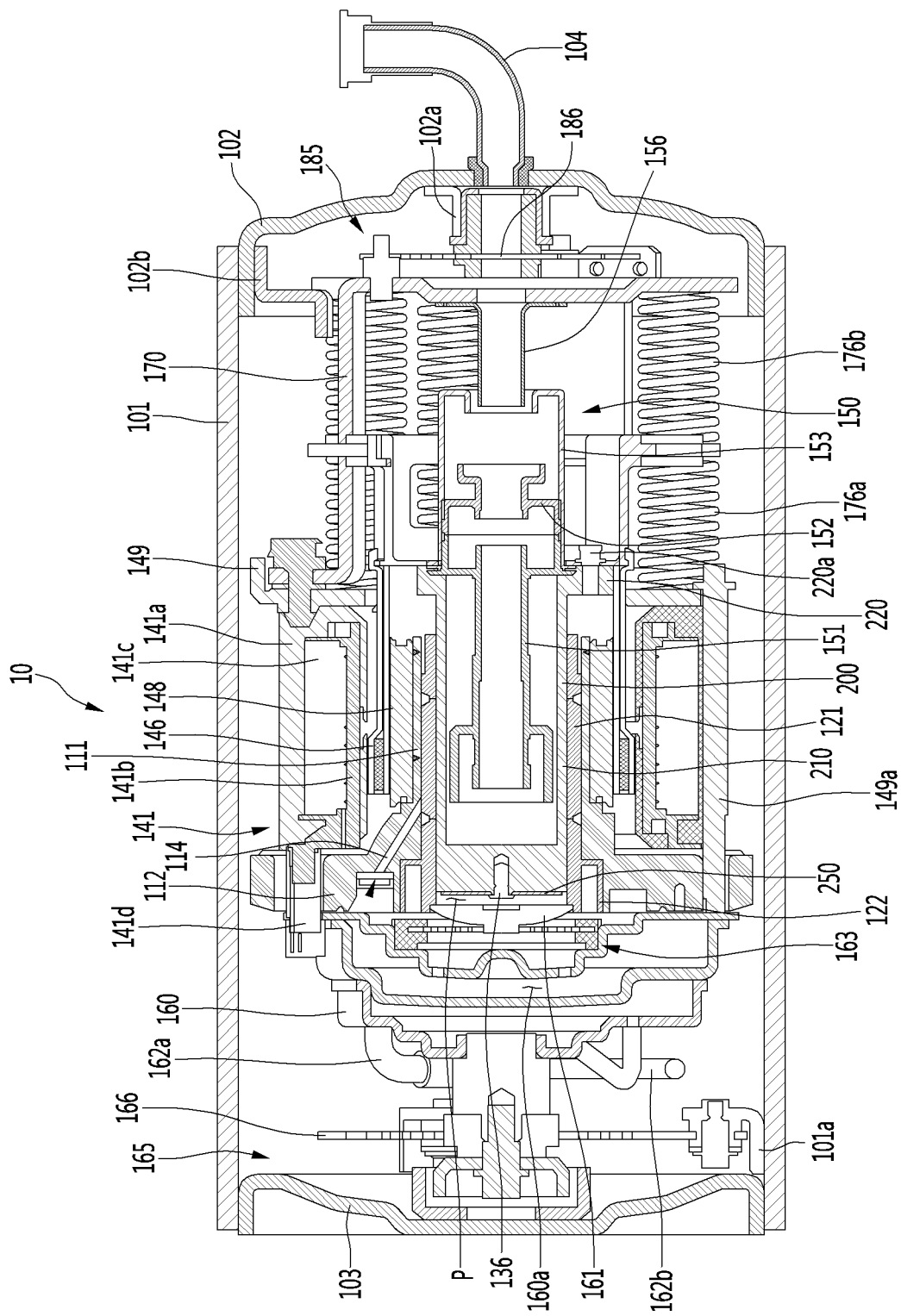
FIG. 10 is a cross-sectional view taken along line IV-IV' of FIG. 1.

FIG. 9 is an exploded perspective view of a compressor body accommodated in a shell of a linear compressor according to a first embodiment of the present disclosure, and FIG. 10 is a cross-sectional view taken along line IV-IV' of FIG. 1.

Referring to FIGS. 9 and 10, the linear compressor 10 includes a cylinder 120 provided inside the shell 101, a piston 200 linearly reciprocating inside the cylinder 120, and a motor assembly 140 as a linear motor for applying driving force to the piston 200. When the motor assembly 140 is driven, the piston 200 may reciprocate in the axial direction.

In addition, the linear compressor 10 further includes a suction muffler 150 coupled with the piston 200 to reduce noise generated from the refrigerant sucked through the suction pipe 104. The refrigerant sucked through the suction pipe 104 flows into the piston 200 through the suction muffler 150. For example, while the refrigerant passes through the suction muffler 150, the flow noise of the refrigerant may be reduced.

The suction muffler 150 includes a plurality of mufflers 151, 152 and 153. The plurality of mufflers includes a first muffler, a second muffler 152 and a third muffler 153 coupled with each other.

The first muffler 151 is located inside the piston 200, and the second muffler 152 is coupled to the rear side of the first muffler 151. IN addition, the third muffler 153 has the second muffler 152 accommodated therein, and extend to the rear side of the first muffler 151. In view of the flow direction of the refrigerant, the refrigerant sucked through the suction pipe 104 may sequentially pass through the third muffler 153, the second muffler 152 and the first muffler 151. In this process, the flow noise of the refrigerant may be reduced.

The suction muffler 150 further includes a muffler filter 155. The muffler filter 155 may be located at a boundary between the first muffler 151 and the second muffler 152. For example, the muffler filter 155 may have a circular shape and the outer circumferential portion of the muffler filter 155 may be supported between the first and second mufflers 151 and 152.

The piston 200 includes a piston body 210 having a substantially cylindrical shape and a piston flange 220 extending from the piston body 210 in the radial direction. The piston body 210 may reciprocate inside the cylinder 120, and the piston flange 220 may reciprocate outside the cylinder 120.

Since the piston 200 was described with reference FIGS. 1 to 3, the structure of the piston 200 will be omitted.

The cylinder 120 includes a cylinder body 121 extending in the axial direction and a cylinder flange 122 provided outside the front portion of the cylinder body 121. In addition, at least a portion of the first muffler 151 and at least a portion of the piston body 210 are configured to be accommodated in the cylinder 120.

The bearing inflow passage 40, through which some of the refrigerant discharged through the discharge valve 161 is introduced, is formed in the cylinder body 121. The bearing inflow passage 40 is formed in the outer circumferential surface of the cylinder body 121.

The bearing inflow passage 40 is formed to be recessed inward from the outer circumferential surface of the cylinder body 121 in the radial direction. A plurality of bearing inflow passages 40 may be provided. A plurality of bearing inflow passages 40 may be disposed to be spaced apart from each other along the outer circumferential surface of the cylinder body 121.

In addition, a compression space P in which refrigerant is compressed by the piston 200 is formed in the cylinder 120. In addition, a suction hole 230, through which refrigerant is introduced into the compression space P, is formed in the front surface portion of the piston body 210, and a suction valve 250 for selectively opening the suction hole 230 is provided at the front side of the suction hole 230.

In addition, a fastening hole coupled with a predetermined fastening member is formed in the front surface portion of the piston body 210. Specifically, the fastening hole is located at the center of the front surface portion of the piston body 210, and a plurality of suction holes 230 is formed to surround the fastening hole. In addition, the fastening member is coupled to the fastening hole through the suction valve 250 to fix the suction valve 250 to the front surface portion of the piston body 210.

A discharge cover 160 forming a discharge space D of the refrigerant discharged from the compression space P and discharge valve assemblies 161 and 163 coupled to the discharge cover 160 to selectively discharge the refrigerant compressed in the compression space P are provided at the front side of the compression space P. The discharge space D includes a plurality of space portions partitioned by the inner wall of the discharge cover 160. The plurality of space portions may be disposed in a front-and-rear direction and communicate with each other.

The discharge valve assemblies 161 and 163 include a discharge valve 161 configured to be opened when the pressure of the compression space P is equal to or greater than discharge pressure to introduce the refrigerant into the discharge space D of the discharge cover 160, and a spring assembly 163 provided between the discharge valve 161 and the discharge cover 160 to provide elastic force in the axial direction.

The spring assembly 162 includes a valve spring 163a and a spring support portion 163b supporting the valve spring 163a on the discharge cover 160. For example, the valve spring 163a may include a leaf spring. In addition, the spring support portion 163b may be integrally injection-molded in the valve spring 163a by an injection process.

The discharge valve 161 is coupled to the valve spring 163a, and the rear portion or the rear surface of the discharge valve 161 is supportably located on the front surface of the cylinder 120. When the discharge valve 161 is supported on the front surface of the cylinder 120, the compression space P is maintained in the sealed state, and, when the discharge valve 161 is spaced apart from the front surface of the cylinder 120, the compression space P is opened, thereby discharging the compressed refrigerant in the compression space P.

Accordingly, the compression space P is understood as a space formed between the suction valve 250 and the discharge valve 161. In addition, the suction valve 250 may be formed at one side of the compression space P, and the discharge valve 161 may be provided at the other side of the compression space P, that is, the opposite side of the suction valve 250.

While the piston 200 linearly reciprocates inside the cylinder 120, when the pressure of the compression space P is less than discharge pressure and is equal to or less than suction pressure, the suction valve 250 is opened and the refrigerant is sucked into the compression space P. In contrast, when the pressure of the compression space P is equal to or greater than the suction pressure, the refrigerant of the compression space P is compressed in a state in which the suction valve 250 is closed.

In addition, when the pressure of the compression space P is equal to or greater than the discharge pressure, the valve spring 163a is deformed forward to open the discharge valve 161, and the refrigerant is discharged from the compression space P to the discharge space D. When discharge of the refrigerant is completed, the valve spring 163a provides restoring force to the discharge valve 161, thereby closing the discharge valve 161.

Meanwhile, the linear compressor 10 further includes a cover pipe 162a coupled to the discharge cover 160 to discharge the refrigerant flowing in the discharge space D of the discharge cover 160. For example, the cover pipe 162a may be made of a metal material.

In addition, the linear compressor 10 further includes a loop pipe 162b coupled to the cover pipe 162a to transfer the refrigerant flowing through the cover pipe 162a to the discharge pipe 105. One side of the loop 162b may be coupled to the cover pipe 162a and the other side thereof may be coupled to the discharge pipe 105.

The loop pipe 162b is made of a flexible material and may be relatively long. In addition, the loop pipe 162b may extend to be rounded from the cover pipe 162a along the inner circumferential surface of the shell 101, thereby being coupled to the discharge pipe 105. For example, the loop pipe 162b may have a wound shape.

The linear compressor 10 further includes a frame 110. The frame 110 is understood as a component for fixing the cylinder 120. For example, the cylinder 120 may be pressed and fitted into the frame 110. In addition, the cylinder 120 and the frame 110 may be made of aluminum or an aluminum alloy.

The frame 110 includes a frame body 111 having a substantially cylindrical shape and a frame flange 112 extending from the frame body 111 in the radial direction. The frame body 111 is disposed to surround the cylinder 120. That is, the cylinder 120 may be located to be accommodated in the fame body 111. In addition, the frame flange 112 may be coupled with the discharge cover 160.

In addition, a bearing supply passage 60, through which at least some of the refrigerant discharged through the discharge valve 161 flows to the gas inflow passage 40, is formed in the frame 110. The bearing supply passage 60 is formed such that the frame flange 112 and the frame body 111 communicate each other.

In addition, a filter for filtering out a foreign material of the refrigerant to be introduced into the bearing supply passage 60 is provided in the frame flange 112. The filter may be pressed and fitted into the internal space formed in the frame flange 112.

The motor assembly 140 includes an outer stator 141, an inner stator 148 spaced apart inward from the outer stator 141, and a magnet 146 located in a space between the outer stator 141 and the inner stator 148.

The magnet 146 may linearly reciprocate by mutual electromagnetic force with the outer stator 141 and the inner stator 148. In addition, the magnet 146 may be composed of a single magnet having one pole or a combination of a plurality of magnets having three poles.

The inner stator 148 is fixed to the outer circumference of the frame body 111. In addition, the inner stator 148 is configured by laminating a plurality of laminations outside the frame body 111 in the radial direction.

The outer stator 141 includes coil windings 141b, 141c and 141d and a stator core 141a. The coil windings include a bobbin 141b and a coil 141c wound in the circumferential direction of the bobbin.

In addition, the coil windings further include a terminal portion 141d for guiding a power line connected to the coil 141c to be drawn out or exposed to the outside of the outer stator 141. The terminal portion 141d may extend to pass through the frame flange 112.

The stator core 141a includes a plurality of core blocks configured by laminating the plurality of laminations in a circumferential direction. The plurality of core blocks may be disposed to surround at least some of the coil windings 141b and 141c.

A stator cover 149 is provided at one side of the outer stator 141. At this time, one side of the outer stator 141 may be supported by the frame flange 12 and the other side thereof may be supported by the stator cover 149. In summary, the frame flange 112, the outer stator 141 and the stator cover 149 are sequentially located in the axial direction.

In addition, the linear compressor 10 further includes a cover fastening member 149a for fastening the stator cover 149 to the frame flange 112. The cover fastening member 149a may pass through the stator cover 149 and extend forward to the frame flange 112 to be coupled to the frame flange 112.

In addition, the linear compressor 10 further includes a rear cover 170 coupled to the stator cover 149 to extend backward and supported by the second support device 185.

Specifically, the rear cover 170 includes three support legs and the three support legs may be coupled to the rear surface of the stator cover 149. A spacer 181 may be interposed between the three support legs and the rear surface of the stator cover 149. By adjusting the thickness of the spacer 181, the distance from the stator cover 149 to the rear end of the rear cover 170 may be determined.

In addition, the linear compressor 10 further includes an inflow guide 156 coupled to the rear cover 170 to guide the refrigerant to flow into the suction muffler 150. At least a portion of the inflow guide 156 may be inserted into the suction muffler 150.

In addition, the linear compressor 10 further includes a plurality of resonant springs 176a 176b each having an adjusted natural frequency, such that the piston 200 resonates. By the action of the plurality of resonant springs 176a and 176b, the driving unit reciprocating inside the linear compressor 10 may stably move, thereby reducing vibration or noise generated according to the movement of the driving unit.

In addition, the linear compressor 10 further includes a first support device 165 coupled to the discharge cover 160 to support one side of the body of the compressor 10. The first support device 165 may be disposed adjacent to the second shell cover 103 to elastically support the body of the compressor 10. Specifically, the first support device 165 includes a first support spring 166. The first support spring may be coupled to the spring fastener 101a.

In addition, the linear compressor 10 further includes a second support device 185 coupled to the rear cover 170 to support the other side of the body of the compressor 10. The second support device 185 may be coupled to the first shell cover 102 to elastically support the body of the compressor 10. Specifically, the second support device 185 includes a second support spring 186. The second support spring 186 may be coupled to the cover support portion 102a.

In addition, the linear compressor 10 includes a plurality of sealing members for increasing adhesion between the frame 110 and the components located near the frame 110. The plurality of sealing members may have a ring shape.

Specifically, the plurality of sealing members includes a first sealing member 127 provided in a portion in which the frame 110 and the discharge cover 160 are coupled. In addition, the plurality of sealing members further includes second and third sealing members 128 and 129a provided in a portion in which the frame 110 and the cylinder 120 are coupled, and a fourth sealing member 129b provided in a portion in which the frame 110 and the inner stator 148 are coupled.

The linear compressor according to the present disclosure having the above configuration may have the following effects.

First, since a distance between the outer circumferential surface of the piston adjacent to the compression space of the cylinder and the inner circumferential surface of the cylinder may be kept small, leakage of the refrigerant, which flows along the outer circumferential surface of the piston, to the compression space may be minimized.

Specifically, the compression space of the refrigerant is formed inside the cylinder and the piston reciprocates inside the cylinder in the axial direction. The piston includes a first part, a second part having a diameter greater than that of the first part, and a third part having a diameter greater than that of the first part.

At this time, the distance between the first outer circumferential surface of the second part and the inner circumferential surface of the cylinder is less than the distance between the second outer circumferential surface of the second part and the inner circumferential surface of the cylinder, thereby minimizing leakage of the bearing refrigerant, which flows to the outer circumferential surface of the piston, to the compression space through the outer circumferential surface of the front end of the piston. Therefore, it is possible to improve the compression efficiency of the linear compressor.

Second, the distance between the second outer circumferential surface of the piston and the inner circumferential surface of the cylinder is kept equal or similar to an existing distance, thereby minimizing friction loss between the cylinder and the piston.

Third, the diameter D1 of the first outer circumferential surface is greater than the diameter D2 of the second outer circumferential surface and the axial length L1 of the first outer circumferential surface is greater than the axial length L2 of the second outer circumferential surface, thereby reducing the amount of bearing refrigerant leaking to the compression space along the outer circumferential surface of the piston.

Fourth, even when the piston retreats to the bottom dead center in the cylinder, the entire first outer circumferential surface is prevented from being exposed to or overlap the bearing inflow passage formed in the cylinder, thereby minimizing refrigerant leakage during the reciprocating movement of the piston.

What is claimed is:

1. A linear compressor comprising:
a frame that defines a bearing supply passage, the bearing supply passage penetrating through the frame;
a cylinder that is disposed in the frame and defines a compression space configured to receive refrigerant, the cylinder defining a bearing inflow passage that extends from an outer circumferential surface of the cylinder to an inner circumferential surface of the cylinder;
a discharge valve disposed at a front end of the cylinder and configured to close the compression space;
a piston configured to reciprocate in the cylinder between a first axial position and a second axial position that are spaced apart from each other in an axial direction and that are located between the front end of the cylinder and the bearing inflow passage, the first axial position being located closer to the front end of the cylinder than to the bearing inflow passage, and the second axial position being located between the first axial position and the bearing inflow passage, wherein the bearing inflow passage is in fluid communication with the bearing supply passage of the frame and an outer circumferential surface of the piston; and
a discharge cover that is coupled to a front end of the frame and defines a discharge space configured to receive the refrigerant discharged from the compression space,
wherein the bearing supply passage is configured to supply a portion of the refrigerant in the discharge space to the bearing inflow passage,
wherein the piston includes:
a first part that extends in the axial direction and that has a first end facing the discharge valve and a second end opposite to the first end, the first part having a first diameter and being configured to disposed in the cylinder and face the bearing inflow passage based on the piston being disposed at the first axial position,
a second part disposed at the first end of the first part, the second part having a second diameter greater than the first diameter of the first part and being configured to be disposed in the cylinder and face the bearing inflow passage based on the piston being disposed at the second axial position, and
a third part disposed at the second end of the first part, the third part including a bearing outer circumferential surface having a third diameter greater than the first diameter of the first part and the bearing outer circumferential surface being configured to be disposed outside the cylinder based on the piston being disposed at the second axial position,
wherein the second part includes:
a first outer circumferential surface that extends from a front surface of the piston facing the discharge valve toward the first end of the first part, and
a second outer circumferential surface that is spaced apart from the first outer circumferential surface in a direction away from the discharge valve, and
wherein a distance between the first outer circumferential surface and the inner circumferential surface of the cylinder is less than a distance between the second outer circumferential surface and the inner circumferential surface of the cylinder.

2. The linear compressor of claim 1, wherein a first diameter of the first outer circumferential surface is greater than a second diameter of the second outer circumferential surface.

3. The linear compressor of claim 1, wherein a first axial length of the first outer circumferential surface in the axial direction is greater than or equal to a second axial length of the second outer circumferential surface in the axial direction.

4. The linear compressor of claim 1, wherein the second part further includes a third outer circumferential surface that connects the first outer circumferential surface to the second outer circumferential surface, and
wherein a diameter of the third outer circumferential surface is less than a diameter of the second outer circumferential surface.

5. The linear compressor of claim 4, wherein the second part further includes an inclined surface that extends from the first outer circumferential surface to the third outer circumferential surface and that is inclined with respect to the first outer circumferential surface, and
wherein a cross-section area of the piston defined by the inclined surface decreases along a direction extending from the first outer circumferential surface to the third outer circumferential surface.

6. The linear compressor of claim 4, wherein the second part further includes an inclined surface that extends from the third outer circumferential surface to the second outer circumferential surface and that is inclined with respect to the second outer circumferential surface, and
wherein a cross-section area of the piston defined by the inclined surface increases along a direction extending from the third outer circumferential surface to the second outer circumferential surface.

7. The linear compressor of claim 4, wherein the first part further includes a connector that defines an outer circumferential surface of the piston and that connects the second part of the piston to the third part of the piston.

8. The linear compressor of claim 7, wherein a diameter of the connector is less than the diameter of the third outer circumferential surface.

9. The linear compressor of claim 8, wherein the second part further includes an inclined surface that extends from the second outer circumferential surface to the connector and that is inclined with respect to the second outer circumferential surface, and
wherein a cross-section area of the piston defined by the inclined surface decreases along a direction extending from the second outer circumferential surface to the connector.

10. The linear compressor of claim 7, includes a bearing outer circumferential surface that extends from the connector in a direction
wherein the bearing outer circumferential surface extends from the connector in a direction away from the first part of the piston, and wherein the third diameter of the bearing outer circumferential surface is greater than a diameter of the connector.

11. The linear compressor of claim 10, wherein the third diameter of the bearing outer circumferential surface is less than or equal to the diameter of the second outer circumferential surface.

12. The linear compressor of claim 1, wherein a diameter of a front end of the piston is less than a first diameter of the first outer circumferential surface.

13. The linear compressor of claim 1, wherein the second part further includes an inclined surface that extends from the front surface of the piston to the first outer circumferential surface and that is inclined with respect to the first outer circumferential surface, and
wherein a cross-section area of the piston defined by the inclined surface increases along a direction extending from the front surface of the piston to the first outer circumferential surface.

14. The linear compressor of claim 1, wherein the bearing inflow passage is configured to:
receive, from an outside of the cylinder into an inside of the cylinder, a portion of the refrigerant discharged from the compression space; and
provide the received refrigerant to the outer circumferential surface of the piston.

15. The linear compressor of claim 14, wherein a portion of the first outer circumferential surface is configured to overlap the bearing inflow passage based on the piston moving from the axial position to the second axial position.

16. The linear compressor of claim 1, wherein the piston includes:
a piston body that has a cylindrical shape and that defines the first outer circumferential surface and the second outer circumferential surface; and
a piston flange that extends from the piston body outward in a radial direction.

17. The linear compressor of claim 16, wherein the piston body has at least one surface inclined with respect to the axial direction, and
wherein a cross-section area of the piston body decreases along a direction from the front surface of the piston facing the discharge valve to a rear surface facing the piston flange.

18. The linear compressor of claim 16, wherein a diameter of the front surface of the piston is greater than a diameter of a rear surface of the piston body.

19. A linear compressor comprising:
a cylinder that defines a compression space therein configured to receive refrigerant;

a piston configured to reciprocate in the cylinder in an axial direction; and a discharge valve disposed at a front end of the cylinder and configured to close the compression space, wherein the piston includes:

a piston body that is disposed in the cylinder and extends rearward from a front end of the piston, the piston body having at least one surface inclined with respect to the axial direction, and a piston flange disposed outside the cylinder and positioned rearward relative to the piston body, the piston flange extending radially outward from the piston body, and wherein a cross-section area of the piston body decreases along a direction from a front surface of the piston body facing the discharge valve to a rear surface of the piston body facing the piston flange, wherein the piston body includes a first bearing, a second bearing disposed rearward relative to the first bearing, a first connector that connects the first bearing to the second bearing, and a second connector that connects the second bearing to the piston flange, and wherein each of the first bearing, the second bearing, and the first connector is inclined with respect to the axial direction.

20. The linear compressor of claim 19, wherein a diameter of each of the first bearing, the first connector, and the second bearing decreases along the direction from the front surface of the piston body to the rear surface of the piston body.

* * * * *